(12) United States Patent
Nicholson et al.

(10) Patent No.: US 12,455,555 B2
(45) Date of Patent: Oct. 28, 2025

(54) AUTOMATED PRODUCTION STATION AND RELATED METHODS

(71) Applicant: ATS CORPORATION, Cambridge (CA)

(72) Inventors: Kenneth Wayne Nicholson, Cambridge (CA); Philip David Munroe, Cambridge (CA); James Mark McLean, Cambridge (CA); Robert James MacGregor, Cambridge (CA); David Andrew Tait, Cambridge (CA); Gustavo Barea, Cambridge (CA)

(73) Assignee: ATS CORPORATION, Cambridge (CA)

( * ) Notice: Subject to any disclaimer, the term of this patent is extended or adjusted under 35 U.S.C. 154(b) by 910 days.

(21) Appl. No.: 17/685,775

(22) Filed: Mar. 3, 2022

(65) Prior Publication Data

US 2022/0281049 A1 Sep. 8, 2022

Related U.S. Application Data

(60) Provisional application No. 63/156,455, filed on Mar. 4, 2021.

(51) Int. Cl.
G05B 19/418 (2006.01)

(52) U.S. Cl.
CPC ........ *G05B 19/4183* (2013.01); *G05B 2219/31304* (2013.01); *G05B 2219/32252* (2013.01); *G05B 2219/32395* (2013.01)

(58) Field of Classification Search
None
See application file for complete search history.

(56) References Cited

U.S. PATENT DOCUMENTS

| | | | |
|---|---|---|---|
| 4,163,313 A | 8/1979 | Matsuno et al. |
| 4,259,627 A | 3/1981 | Matsuno et al. |
| 4,309,600 A | 1/1982 | Perry et al. |
| 5,374,231 A | 12/1994 | Obrist |
| 9,904,281 B2 | 2/2018 | Nicholson et al. |
| 10,018,985 B2 | 7/2018 | Nicholson et al. |
| 2017/0227946 A1 | 8/2017 | Nicholson et al. |

FOREIGN PATENT DOCUMENTS

DE 3543209 A1 6/1987

OTHER PUBLICATIONS

Extended European Search Report, The Hague, Jun. 30, 2022.
Extended European Search Report issued Oct. 11, 2022 in EP22160273.3.
Extended European Search Report issued Jan. 13, 2025 in EP24206213.1.

*Primary Examiner* — Sean Shechtman

(57) ABSTRACT

Methods and systems are provided for mass producing different products in an automated production station having a plurality of part-processing devices. An example method includes identifying a workpiece received in the production station; selecting control parameters associated with the identified workpiece; electronically synchronizing the part-processing devices based on the selected control parameters to perform coordinated operations on the workpiece for producing one of the different products; and automatically repeating the identifying, selecting, and synchronizing steps for different workpieces received in the production station to produce a plurality of different products in a continuous mass production process.

20 Claims, 12 Drawing Sheets

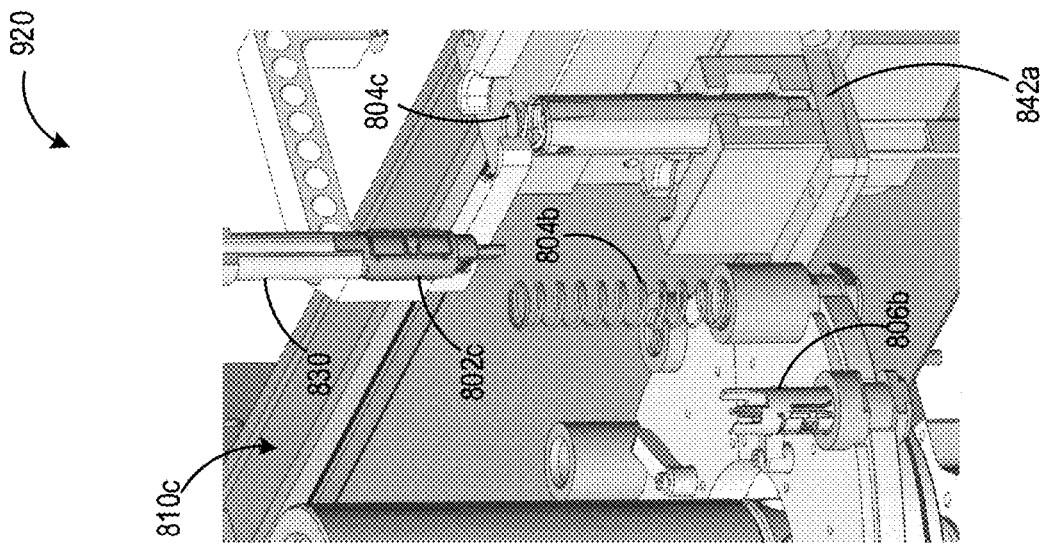
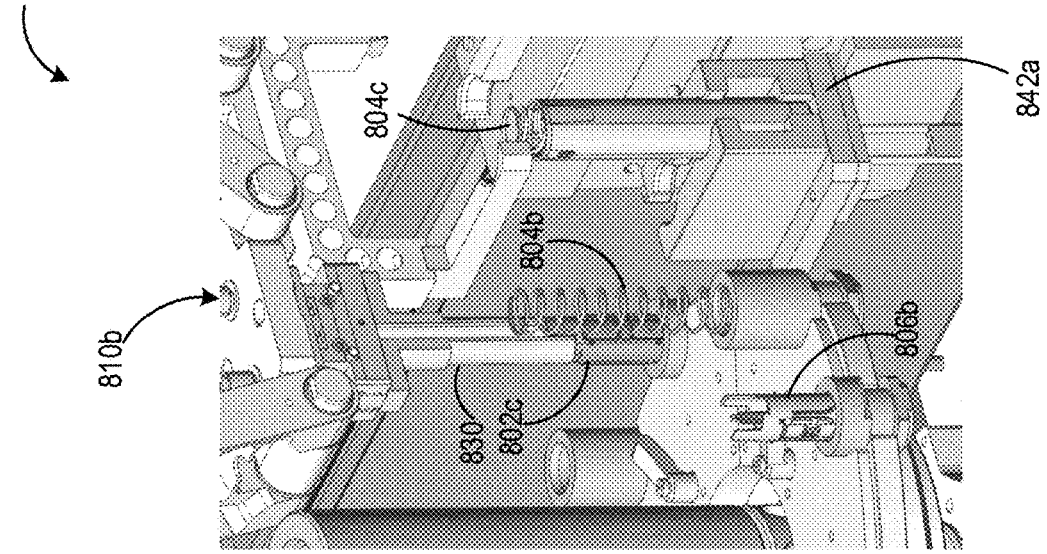
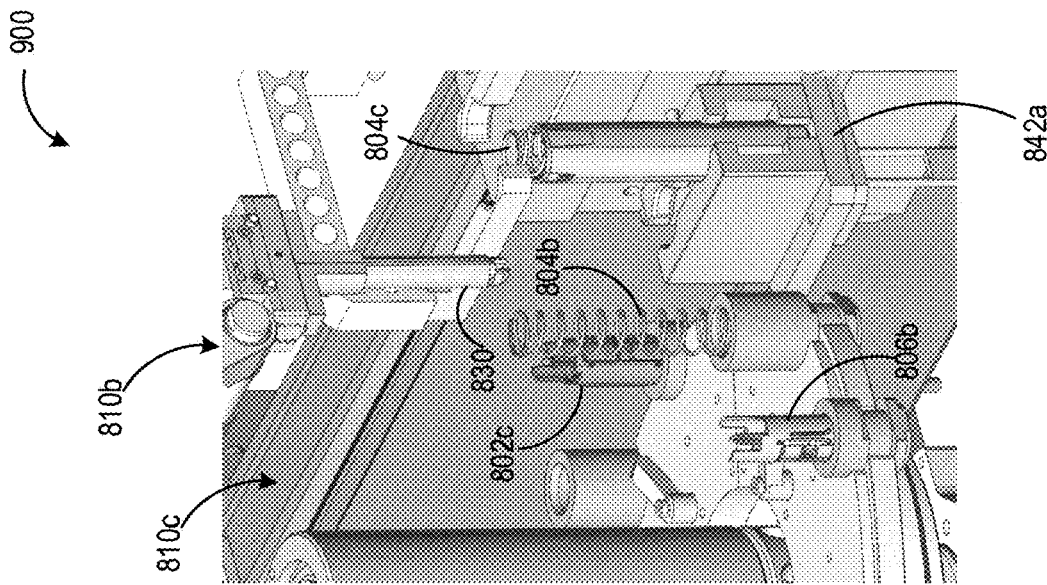

AUTOMATED PRODUCTION STATION AND RELATED METHODS

CROSS-REFERENCE TO RELATED APPLICATIONS

This application claims the benefit of U.S. Provisional Patent Application No. 63/156,455, filed on Mar. 4, 2021. The entire contents of U.S. Provisional Patent Application No. 63/156,455 is hereby incorporated by reference for all purposes.

FIELD

The described embodiments relate to systems and methods for production of different products in an automated production station.

BACKGROUND

U.S. Pat. No. 9,904,281 (Nicholson et al.) discloses an automated method of assembling or processing components using computer numerical controlled drives to decouple the stages of delivering components to a tool, into a series of separately programmable stages, namely, a component loading stage, a component separating stage, an accelerating stage, and a delivery stage, wherein the timing, position, speed, velocity, and acceleration of each component during each stage is selected through programming of the computer numerical controls.

U.S. Pat. No. 10,018,985 (Nicholson et al.) discloses a device, system and method of automated manufacture comprising: delivering a workpiece with a delivery device; receiving the workpiece with a receiving device, the delivering of the workpiece and the receiving of the workpiece being electronically synchronized; processing the workpiece with a processing tool while the workpiece is on the receiving device; transferring the workpiece to a completion device, the ejection of the workpiece and the transferring of the workpiece being electronically synchronized. In particular the workpiece may comprise: a platform with mounts supporting a first component in a selected orientation; and a locating surface, the method comprising: engaging and disengaging the locating surface of the workpiece with releasable connectors on the delivery device, on the receiving device and on the completion device.

SUMMARY

The following summary is intended to introduce the reader to various aspects of the applicant's teaching, but not to define any invention.

The various embodiments described herein generally relate to methods (and associated systems) for mass producing different products in an automated production station having a plurality of part-processing devices.

BRIEF DESCRIPTION OF THE DRAWINGS

The drawings included herewith are for illustrating various examples of apparatuses, systems, and processes of the present specification and are not intended to limit the scope of what is taught in any way. In the drawings:

FIGS. 11A-11C show the workpiece transfer device of FIG. 10 transferring a first workpiece from the indexing device of FIG. 10 for further processing.

DETAILED DESCRIPTION

Figure 1:
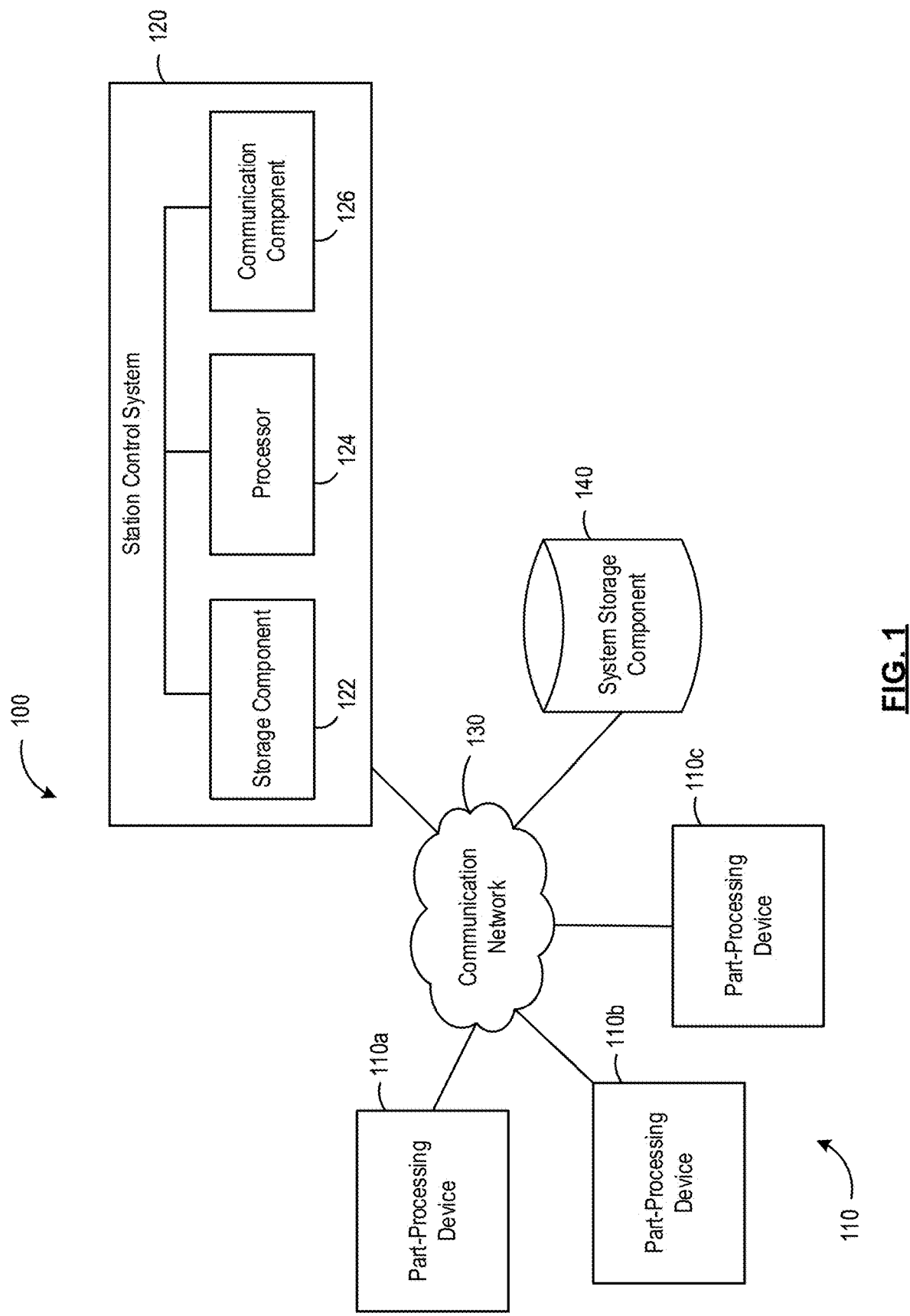
FIG. 1 is a schematic diagram of an example automated production station for mass producing a plurality of different products.

Various apparatuses, systems, or processes will be described below to provide an example of an embodiment of each claimed invention. No embodiment described below limits any claimed invention and any claimed invention may cover apparatuses, processes, or systems that differ from those described below. The claimed inventions are not limited to apparatuses, systems, or processes having all of the features of any one apparatus, system, or process described below or to features common to multiple or all of the apparatuses, systems, or processes described below. It is possible that an apparatus, system, or process described below is not an embodiment of any claimed invention. Any invention disclosed in an apparatus, system, or process described below that is not claimed in this document may be the subject matter of another protective instrument, for example, a continuing patent application, and the applicants, inventors, or owners do not intend to abandon, disclaim, or dedicate to the public any such invention by its disclosure in this document.

A production process can involve processing (e.g. transferring, transporting, handling, manipulating, assembling, etc.) parts to produce a product. During the production process, the part requiring further processing (for example, a subcomponent or partially finished product) can be referred to as a workpiece. The workpiece can be moved through a production station among various part-processing devices that perform the various operations on the workpiece(s) in production of the product. In some examples, such production processes can utilize a large number of standard, multi-purpose, re-configurable machines for performing specific operations on the workpiece(s) in production of the product.

To introduce different parts/workpieces and/or produce different products, addition of machines and/or separate processing lines may be required. In some examples, limited space in production facilities may preclude such expansion. Certain machines may also require manual reconfiguration and retooling when switching between different parts and/or products for processing, which may contribute to production overhead and inefficiencies. Furthermore, in some examples, production of certain products may require use of only a subset of part-processing devices in the production station, with the remaining devices remaining idle and resulting in underutilization of available production assets.

According to some aspects of the present disclosure, an automated production station can accommodate different workpieces for producing different end products in a continuous mass production process, without necessarily requiring extensive additions and/or reconfiguration of production station assets when producing different products, and which may facilitate improved utilization of existing production station assets.

According to some aspects, the production station of the present disclosure can operate to distinguish between at least a first workpiece and a second workpiece fed into the production station for processing. The first workpiece can be for producing a first product in the production station and the second workpiece can be for producing a second product in the production station that is different from the first product. In response to identifying the first workpiece as being received in the production station, control parameters associated with the first workpiece are selected, and a plurality of part-processing devices in the production station are electronically synchronized based on the selected control parameters to perform coordinated operations on the first workpiece in production of the first product. In response to identifying the second workpiece as being received in the production station, control parameters associated with the second workpiece are selected, and the part-processing devices in the production station are electronically synchronized based on the selected control parameters to perform coordinated operations on the second workpiece in production of the second product. The identifying, selecting, and synchronizing steps for the first workpiece can be repeated a plurality of times for producing a plurality of the first products, and the identifying, selecting, and synchronizing steps for the second workpiece can be repeated a plurality of times for producing a plurality of the second products interchangeably with the first products in a continuous mass production process of the first and second products.

Referring to FIG. 1, an example automated production station 100 is shown for producing different products. The production station 100 can include one or more part-processing devices 110, a station control system 120, a communication network 130, and a system storage component 140. Although only three part-processing devices 110*a*, 110*b*, and 110*c* are shown in FIG. 1, the automated production station 100 may include fewer or more part-processing devices 110.

The station control system 120 can include control interfaces that allow a user to electronically configure the automated production station 100. The station control system 120 can select control parameters for the part-processing device 110 to perform coordinated operations. The control parameters can be determined by the station control system 120, or received at the station control system 120 as input data. As shown in FIG. 1, the station control system 120 includes a station storage component 122, a station processor 124, and a station communication component 126.

The station storage component 122 can include RAM, ROM, one or more hard drives, one or more flash drives or some other suitable data storage elements such as disk drives. The station storage component 122 can include one or more databases for storing data related to the automated production station 100. The station storage component 122 can store data in respect of the operation of the automated production station 100, such as data in respect of the part-processing devices 110 and the coordinated operations being carried out by the part-processing devices 110.

For example, the station storage component 122 can store data received from the part-processing devices 110, data in respect of the coordinated operations delegated by the station control system 120, property data in respect of each of the part-processing devices 110, etc. The station storage component 122 can also store computer programs that are executable by the station processor 124 to facilitate communication between the station control system 120 and the part-processing devices 110, and configuration of the part-processing devices 110.

In some embodiments, the station storage component 122 can instead be the system storage component 140, which is accessible via the communication network 130.

In some embodiments, the station storage component 122 can store data that is more current based on the operation of the station control system 120, and the system storage component 140 can store data that is considered by the station control system 120 to unlikely be used in the immediate future. For example, the station storage component 122 can store operating data and part-processing property data only for the part-processing devices 110 operating during a certain production run or day, whereas the system storage component 140 can store the data for all part-processing devices 110, which is typically infrequently changed. In some embodiments, the system storage component 140 can be a third party data storage.

The station processor 124 can control the operation of the station control system 120. The station processor 124 may be implemented any suitable processors, controllers, digital signal processors, graphics processing units, application specific integrated circuits (ASICs), field programmable gate arrays (FPGAs), microcontrollers, and/or other suitably programmed or programmable logic circuits that can provide sufficient processing power depending on the configuration, purposes and requirements of the station control system 120. In some embodiments, the station processor 124 can include more than one processor with each processor being configured to perform different dedicated tasks. The station processor 124 together with the processor at the part-processing devices 110 contribute to the control of the automated production station 100.

The station communication component 126 can include any interface that enables the station control system 120 to communicate with various devices and other systems. For example, the station communication component 126 can facilitate communication with the other components of the automated production station 100, such as the part-processing devices 110 and the system storage component 140 via the communication network 130.

The station communication component 126 can include at least one of a serial port, a parallel port or a USB port, in some embodiments. The station communication component 126 may also include an interface to component via one or more of an Internet, Local Area Network (LAN), Ethernet, Firewire, modem, fiber, or digital subscriber line connection. Various combinations of these elements may be incorporated within the station communication component 126. For example, the station communication component 126 may receive input from various input devices, such as a mouse, a keyboard, a touch screen, a thumbwheel, a track-pad, a track-ball, a card-reader, voice recognition software and the like depending on the requirements and implementation of the station control system 120.

The communication network 130 can include any network capable of carrying data, including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these, capable of interfacing with, and enabling communication between the station control system 120, the part-processing devices 110, and the system storage component 140.

For example, each part-processing device 110 and the station control system 120 may be equipped with a wireless communication interface to enable wireless communications according to a Wi-Fi protocol (e.g. IEEE 802.11 protocol or similar).

Similar to the station storage component 122, the system storage component 140 can store information about the part-processing devices 110, including operating data, profile data (e.g., servo-motor profile data), motion data with which the part-processing devices 110 operate (e.g., tool motion data), data in respect of products that the automated production station can produce, data in respect of parts or workpieces that may be used to produce the products.

Profile data, motion data, product data, part data, and workpiece data can be stored in the system storage component 140 for subsequent retrieval by the part-processing devices 110. The part-processing devices 110 can download motion data, product data, part data, and workpiece data from the system storage component 140 via the communication network 130, for example.

Profile data and motion data can be generated for the part-processing devices 110. For example, tables representing the profile data and motion data of tools of the part-processing devices 110 can be imported and form the basis for the profile data and motion data, respectively. In another example, the station control system 120 can generate the motion data based on data collected by the part-processing device 110.

In some embodiments, operating data can be stored in the system storage component 140, and the operating data can be retrieved by the station control system 120 when needed. The station control system 120 can download the operating data from the system storage component 140 via the communication network 130. Example operating data can include, but not limited to, a current position of one or more tooling of the part-processing device 110, a current speed of one or more tooling of the part-processing device 110, a current velocity of one or more tooling of the part-processing device 110, and a current acceleration of one or more tooling of the part-processing device 110. In some embodiments, the operating data, or at least some of the operating data, can be stored in the station storage component 122.

In some embodiments, one or more computing devices (not shown in FIG. 1) can communicate with the automated production station 100 via the communication network 130. A user may electronically configure the automated production station 100 using the computing device. The computing device can include any device capable of communication with other devices through a network such as communication network 130. The computing device can include a processor and memory, and may be an electronic tablet device, a personal computer, workstation, server, portable computer, mobile device, personal digital assistant, laptop, smart phone, WAP phone, an interactive television, video display terminals, gaming consoles, and portable electronic devices or any combination of these.

Figure 2:
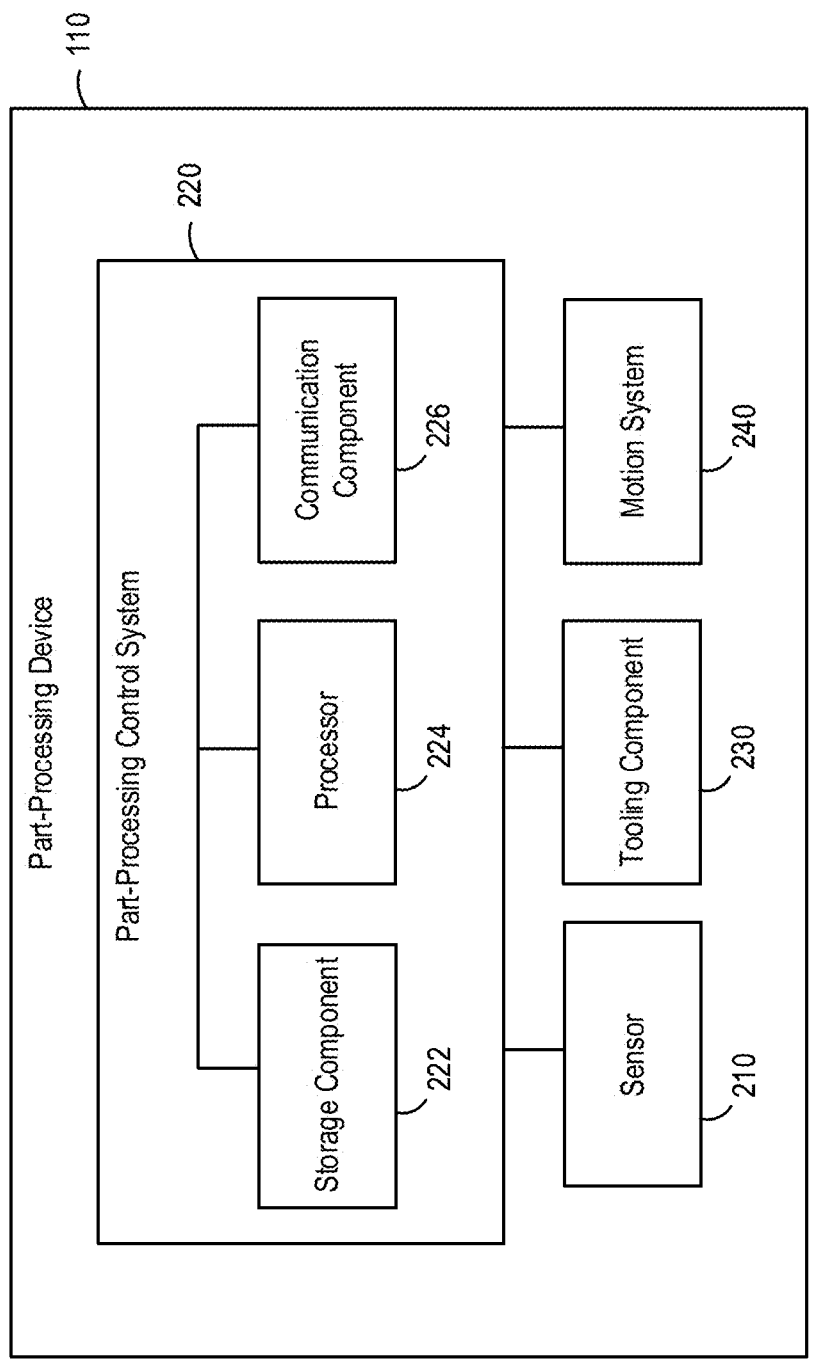
FIG. 2 is a schematic diagram of an example part-processing device for the automated production station of FIG. 1.

Reference is now made to FIG. 2, which shows a block diagram of an example part-processing device 110. The example part-processing device 110 can be part-processing devices 110a, 110b, 110c of the automated production station 100. The part-processing device 110 includes a part-processing control system 220, a sensor system 210, one or more tooling components 230, and a motion system 240.

The part-processing control system 220 can include a processor 224, a storage component (or memory) 222, and a communication component 226. The part-processing control system 220 can facilitate the operation of the part-processing device 110. The part-processing control system 220 can include control interfaces that allow a user to electronically configure the part-processing device 110. The part-processing control system 220 can collect and store motion data of the part-processing device 110 in the part-processing storage component 222.

The processor 224 can include any suitable processors, controllers, digital signal processors. microcontrollers, and/or other suitably programmed or programmable logic circuits that can provide sufficient processing power depending on the configuration, purposes and requirements of the part-processing device 110. In some embodiments, the processor 224 can include more than one processor with each processor being configured to perform different dedicated tasks.

The part-processing storage component 222 can store data to be used during the operation of the part-processing device 110 and/or to facilitate the operation of the part-processing device 110. Example data can include operating data in respect of its operation, and data in respect of parts, workpieces, or the product etc.

In some embodiments, the part-processing storage component 222 can store software applications executable by the processor 224. For example, the software application can facilitate communication with the station control system 120 and/or operation of the part-processing device 110, including components thereof such as but not limited to tooling components 230, pneumatic actuators, servo-motors, and others.

The communication component 226 can include any component for facilitating communication with the station control system 120 via the communication network 130. For example, the communication component 226 can include a wireless transceiver for communicating within a wireless communications network.

The sensor system 210 can include one or more sensors for collecting data from the environment of the part-processing device 110. For example, the sensor system 210 can include a LiDAR device (or other optical/laser, sonar, radar range-finding such as time-of-flight sensors). The sensor system 210 can include optical sensors, such as video cameras and systems (e.g., stereo vision).

The sensor system 210 can detect workpieces within a detection range. Furthermore, the sensor system 210 can detect different properties of the workpieces and generate identification data for the workpieces. The term "workpiece" used herein refers to a part or a partially-finished product. Parts can have different geometric properties, such as but not limited to, different types, shapes, and sizes. The terms "different parts" and/or "different products" used herein refers to parts having such different properties and not merely a plurality of identical parts.

The part-processing device 110 can receive control parameters from the station control system 120, a control interface, or an external system. Based on the control parameters, the part-processing control system 220 can operate the part-processing device 110 to process a workpiece detected by the sensor system 210.

In some embodiments, the part-processing device 110 can be equipped with one or more tooling components 230 for engaging with workpieces detected by the sensor system 210. Tooling components 230 can be used to present a part or process a part. Example tooling components 230 can include screws or end of arm tooling. The operation of the tooling components 230 can be controlled by the part-processing control system 220 and, in some embodiments, with consideration of the data collected by the sensor system 210.

Part-processing devices 110 can be equipped with a motion system 240 for facilitating motion of the part-processing devices 110 or components thereof, such as sensors 210 or tooling components 230. The motion system 240 can include one or more pneumatic actuators and/or servo-motors.

Part-processing devices 110 can undergo testing or validation. Testing or validation can determine the operation of the part-processing device 110 satisfies certain requirements, such as accuracy, reliability, and speed. Specialized testing and validation may also be required when the automated production station 100 is configured to produce certain products, such as but not limited to, food or beverage, vehicle, pharmaceutical, and medical products.

Figure 3:
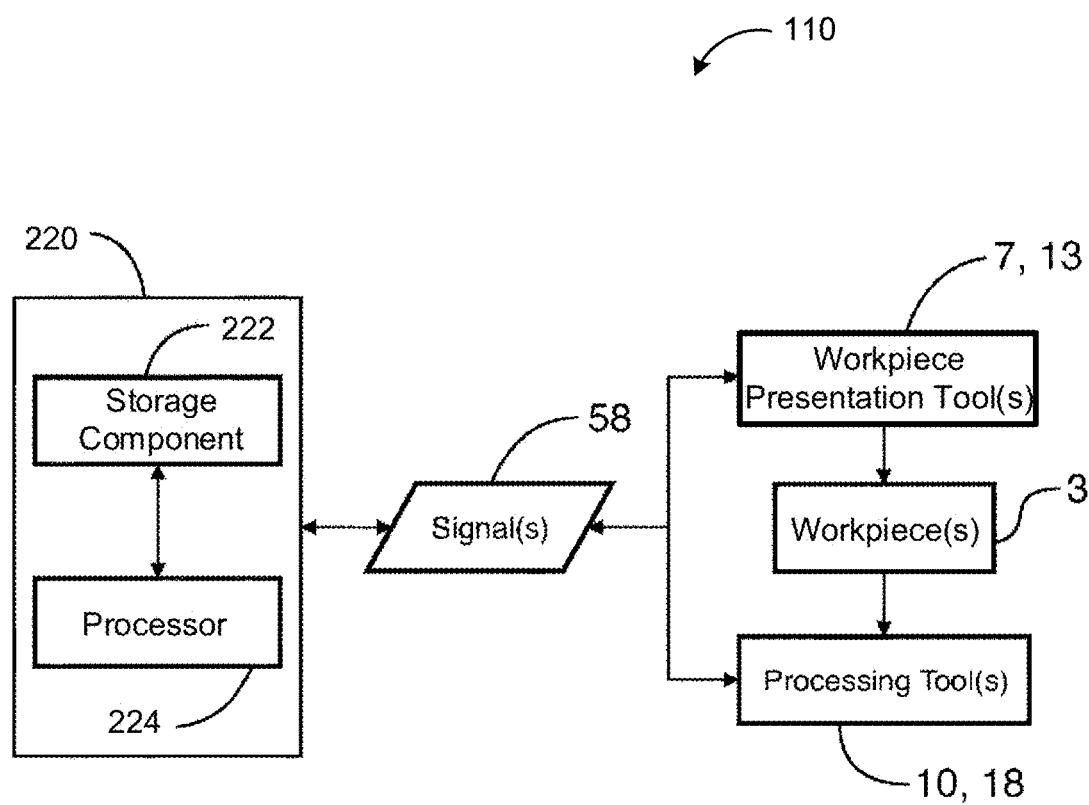
FIG. 3 is another schematic diagram of an example part-processing device for the automated production station of FIG. 1.

Reference is now made to FIG. 3, which shows another schematic diagram of part-processing device 110 for the automated production station of FIG. 1. Part-processing device 110 can handle one or more workpieces 3. As shown in FIG. 3, part-processing device 110 can include tooling components 230 such as one or more workpiece presentation tools 7, 13 and one or more processing tools 10, 18.

Workpiece presentation tools 7, 13 can, for example, be a part of one or more component delivery devices. In some embodiments, workpiece presentation tools 7,13 can include one or more screws for separating a lead component from an adjacent component. Accordingly, workpiece presentation tool 7, 13 can be configured to: load one or more workpieces 3 at an intake position at a leading end of a stream of like workpieces 3; separate workpiece 3 from the like workpieces 3; accelerate workpiece 3; and deliver workpiece 3 at a predetermined delivery time, delivery position, delivery speed and moving along a delivery trajectory. Workpiece presentation tool 7, 13 can be configured to deliver workpieces 3 before loading one or more subsequent workpieces 3 at the intake position.

Processing tools 10, 18 can, for example, be a part of one or more receiving devices. Processing tool 10 can be configured to conduct one or more value-added operation using one or more of workpieces 3. For example, processing tool can be configured to assemble two or more of workpieces 3 together. In some embodiments, processing tool 10, 18 can include one or more of assembly tools 10, 18. Accordingly, processing tool 10, 18 can be configured to: receive one or more workpieces 3 while processing tool 10, 18 moves along a processing tool trajectory configured to permit transfer of the component(s) 3 at the delivery position from workpiece presentation tool 7, 13 to processing tool 10, 18; process workpiece 3; and move workpiece 3 to an ejection position.

Part-processing device 110 can also include one or more part-processing control systems 220. As described above, part-processing control system 220 can include one or more processors 224 and related accessories that enable control of at least some aspects of performance of workpiece presentation tool 7, 13 and/or processing tool 10, 18. Processor 224 may, for example, be configured to make decisions regarding the control and operation of part-processing device 110 and cause one or more actions to be carried out based on machine-readable instructions including those stored within part-processing control system 220 and/or other machine-readable instructions received at part-processing control system 220 via wired and/or wireless communication.

Part-processing control system 220 can also include storage component 222, such as memory(ies), memory data devices or register(s). Storage component 222 can include any storage means (e.g., devices) suitable for retrievably storing machine-readable instructions executable by processor 224 of part-processing control system 220 and other data. Storage component 222 can be non-volatile and can include erasable programmable read only memory (EPROM), flash memory, and/or other electromagnetic media suitable for storing electronic data signals in volatile or non-volatile, non-transient form. Storage component 222 can contain machine-readable instructions for execution by processor 224 and also other data related to the operation of workpiece presentation tool 7, 13 and/or processing tool 10, 18. For example, storage component 222 can hold feedback data representative of feedback signals received from one or more sensors (e.g., encoders) associated with workpiece presentation tool 7, 13 and/or processing tool 10, 18.

Machine-readable instructions stored in storage component 222 can cause part-processing control system 220 to cause the execution of various methods disclosed herein including the generation of one or more signals 58 (e.g., output data) useful in the operation of the part-processing device 110. Such machine-readable instructions can be incorporated into one or more computer program products which can be stored on suitable medium or media. In some embodiments, the machine-readable instructions can be executable by processor 224 and configured to cause processor 224 to generate signals 58 useful in the synchronization of two or more operations carried out by workpiece presentation tool 7, 13 and/or processing tool 10, 18. That is, the machine-readable instructions can be executable by processor 224 can cause the processor 224 to select control parameters for the operation of workpiece presentation tool 7, 13 and/or processing tool 10, 18 and generate signals 58 representative of the control parameters. For example, the machine-readable instructions can be configured to cause processor 224 to generate signals 58 useful in the synchronization of the delivery of workpiece 3 by workpiece presentation tool 7, 13 and the receipt of workpiece 3 by component processing tool 10, 18.

The synchronization of two or more operations of workpiece presentation tool 7, 13 and processing tool 10, 18 can effectively include electronic camming and/or electronic gearing instead of mechanical cams and/or gears used in some existing applications. In various embodiments, the use of such electronic synchronization can provide more flexibility and improved performance of part-processing device 110 in comparison with conventional systems comprising mechanical synchronization means. Accordingly, in various embodiments, storage component 222 can hold data representative of one or more cam profiles to be used in the operation of workpiece presentation tool 7, 13 and processing tool 10, 18. For example, such cam profile(s) can be in tabular form and can include corresponding positions representative of synchronized trajectories to be followed by workpiece presentation tool 7, 13 and processing tool 10, 18 during operation. In various embodiments, one of workpiece presentation tool 7, 13 and processing tool 10, 18 can be operated as a master device and the other of workpiece presentation tool 7, 13 and processing tool 10, 18 can be operated as a slave device executing movements based on the execution of movements by the master device in order to substantially maintain synchronization between the slave device and the master device. In some embodiments, part-processing device 110 can include one or more master devices and one or more respective slave devices. For example, one or more slave devices can be electronically cammed with a master device.

Accordingly, in various embodiments, the machine-readable instructions can be configured to cause processor 224 to generate signals 58 useful in causing electronic camming of the delivery of workpiece 3 by workpiece presentation tool 7, 13 and of the receipt of workpiece 3 by processing tool 10, 18. In some embodiments, the machine-readable instructions can be configured to cause processor 224 to generate signals 58 useful in causing electronic camming of the loading, separation, acceleration and delivery of workpiece 3 by workpiece presentation tool 7, 13, and, of the receipt of workpiece 3 by processing tool 10, 18.

In various embodiments, the machine-readable instructions can be configured to cause data processor to generate signals 58 useful in controlling movement of workpiece 3 along the delivery trajectory and controlling movement of processing tool 10, 18 along the processing tool trajectory. The delivery trajectory and the processing tool trajectory can be substantially tangential at the delivery position of workpiece 3. Similarly, the machine-readable instructions can be configured to cause processor 224 to generate signals 58 useful in causing the delivery speed of workpiece 3 and a speed of processing tool 10, 18 to be substantially the same when workpiece 3 is at the delivery position. Accordingly, the transfer of workpiece 3 from workpiece presentation tool 7, 13 to processing tool 10, 18 can be relatively smooth (i.e., substantially free of significant acceleration and/or jerk). The smooth transfer or workpiece 3 can also substantially reduce the risk of damaging workpiece 3 and can also permit the transfer of relatively delicate workpieces in some applications.

In various embodiments, the machine-readable instructions can be configured to cause processor 224 to generate signals 58 useful in controlling at least some aspect of the processing of the workpiece 3. For example, such processing can include one or more value-added operations that can be carried out by processing tool 10, 18. Such value-added operation can include the assembly of two or more or workpieces 3 together. Such operation or other operations associated with part-processing device 110 can also be electronically synchronized with one or more of workpiece presentation tool 7, 13 and processing tool 10, 18 and can also operate as a master device or as a slave device depending on the specific application. Accordingly, the machine-readable instructions may, for example, be configured to cause processor 224 to generate signals 58 useful in causing electronic camming of the processing of workpiece 3 and one or more operations associated with workpiece presentation tool 7, 13 and processing tool 10, 18. Alternatively, one or more operations conducted by workpiece presentation tool 7, 13 or processing tool 10, 18 can be under binary control rather than direct electronic synchronization. However, in some embodiments, the triggering of an operation via a binary control signal can be dependent on the position of the master device and can still be based on the cam profile.

As explained above, part-processing device 110 can include one or more servo-motors associated with workpiece presentation tool 7, 13 and one or more servo-motors associated with processing tool 10, 18. Accordingly, the machine-readable instructions can be configured to cause processor 224 to generate signals useful in controlling the one or more servo-motors associated with workpiece presentation tool 7,13 and the one or more servo-motors associated with processing tool 10, 18 according to a predetermined cam profile.

Figure 4:
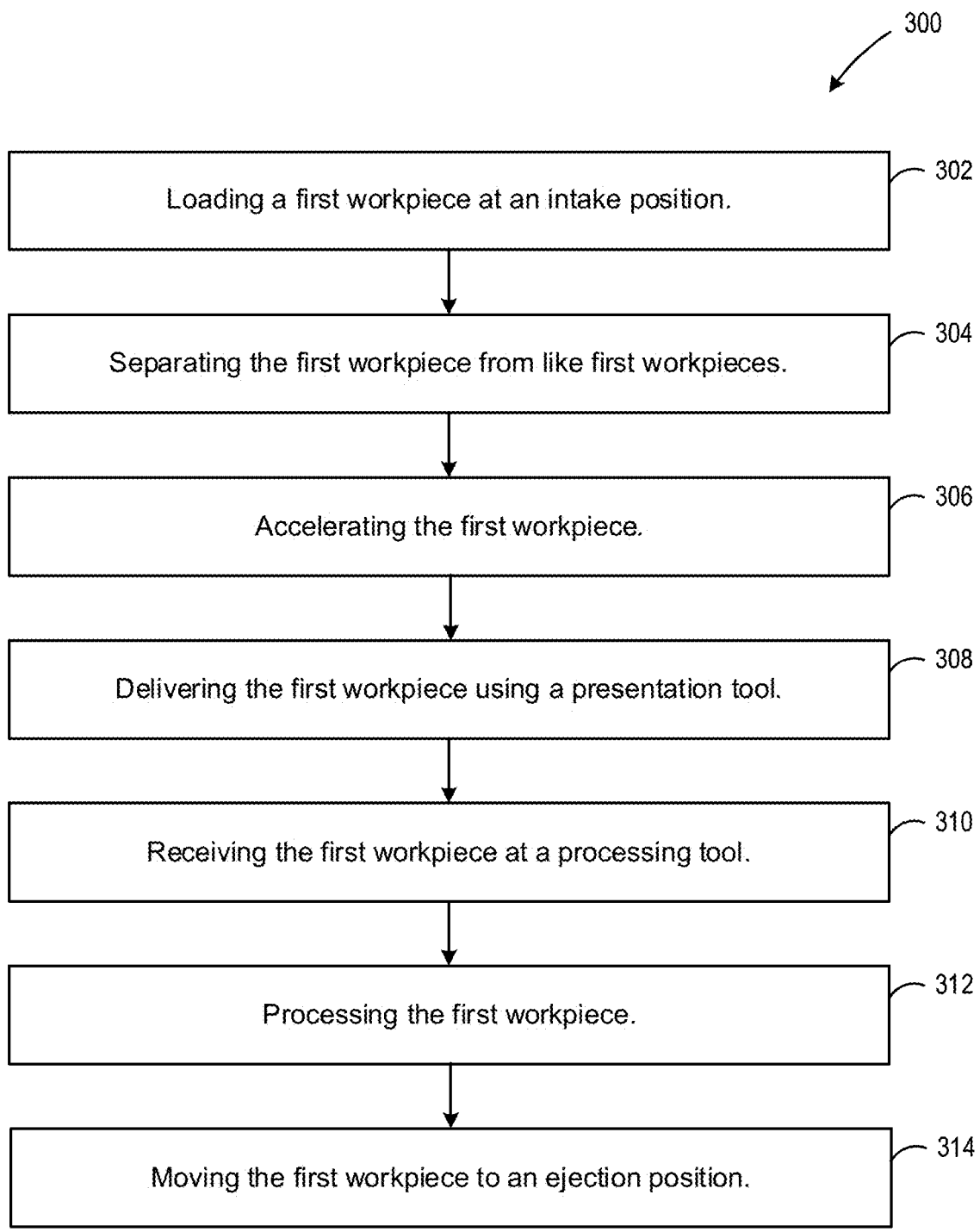
FIG. 4 is flowchart diagram of a method for handling workpieces.

Reference is now made to FIG. 4, which shows a flowchart illustrating a method 300 for handling workpieces. In some embodiments, method 300 can also include the performance of one or more valued-added operations. The devices and tools disclosed herein can be configured for cooperative operation with each other for performing all or part of method 300. In various embodiments, method 300 can involve: loading a first workpiece 3 at an intake position at a leading end of a stream of like first workpieces 3 (see block 302); separating first workpiece 3 from like first workpieces (see block 304); accelerating first workpiece 3 (see block 306); delivering first workpiece 3 at a predetermined delivery time, delivery position, delivery speed and moving along delivery trajectory using first workpiece presentation tool 7, 13 (see block 308); receiving first workpiece 3 at processing tool 10, 18 moving along a processing tool trajectory configured to permit transfer of first workpiece 3 at the delivery position from first workpiece presentation tool 7, 13 to processing tool 10, 18 (see block 310); processing first workpiece 3 (see block 312); and moving the first workpiece 3 to an ejection position (see block 314). The delivering of first workpiece 3 and the receiving of the first workpiece 3 can be electronically synchronized. Method 300 can also involve delivering workpiece 3 before loading a subsequent workpiece at the intake position.

As explained above, the delivery trajectory and the processing tool trajectory can be substantially tangential when first workpiece 3 is at the delivery position and the transfer of first workpiece 3 between workpiece presentation tool 7, 13 and processing tool 10, 18 is occurring. Also, the delivery speed of first workpiece 3 and a speed of processing tool 10, 18 can be substantially the same when first workpiece 3 is at the delivery position and the transfer of first workpiece 3 is occurring. Method 300 can also involve receiving a second workpiece 3 at processing tool 10, 18. Method 300 can also involve assembling first workpiece 3 with second workpiece 3. It should be understood that the first and second workpieces can be different from each other and can be configured for assembly with each other.

The delivering of first workpiece 3 can include a first computer numerically controlled operation and the receiving of first workpiece 3 can include a second computer numerically controlled operation. The first computer numerically controlled operation and the second computer numerically controlled operation can be electronically synchronized (e.g., cammed, geared) as explained above.

Similarly, the loading, separating, accelerating and delivering of first workpiece 3 can include a first computer numerically controlled operation and the receiving of first workpiece 3 can includes a second computer numerically controlled operation. The first computer numerically controlled operation and the second computer numerically controlled operation can be electronically synchronized (e.g., cammed, geared).

Instead or in addition, the receiving of first workpiece 3 can include a first computer numerically controlled operation and the processing of first workpiece 3 can include a second computer numerically controlled operation. The first computer numerically controlled operation and the second computer numerically controlled operation can be electronically synchronized (e.g., cammed, geared).

Figure 5:
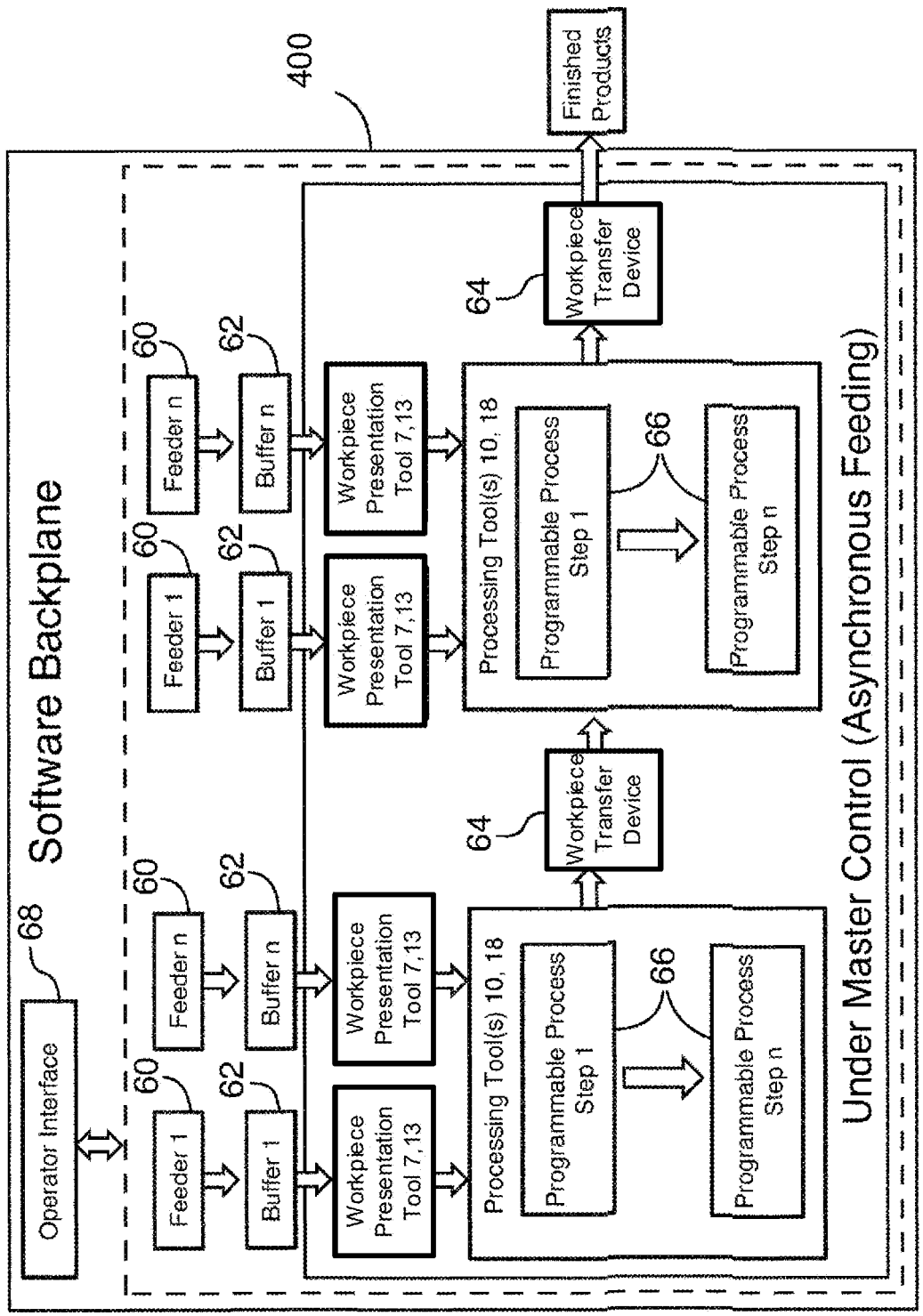
FIG. 5 is a schematic diagram of an example system for processing workpieces using asynchronous feeding of workpieces.
Figure 6:
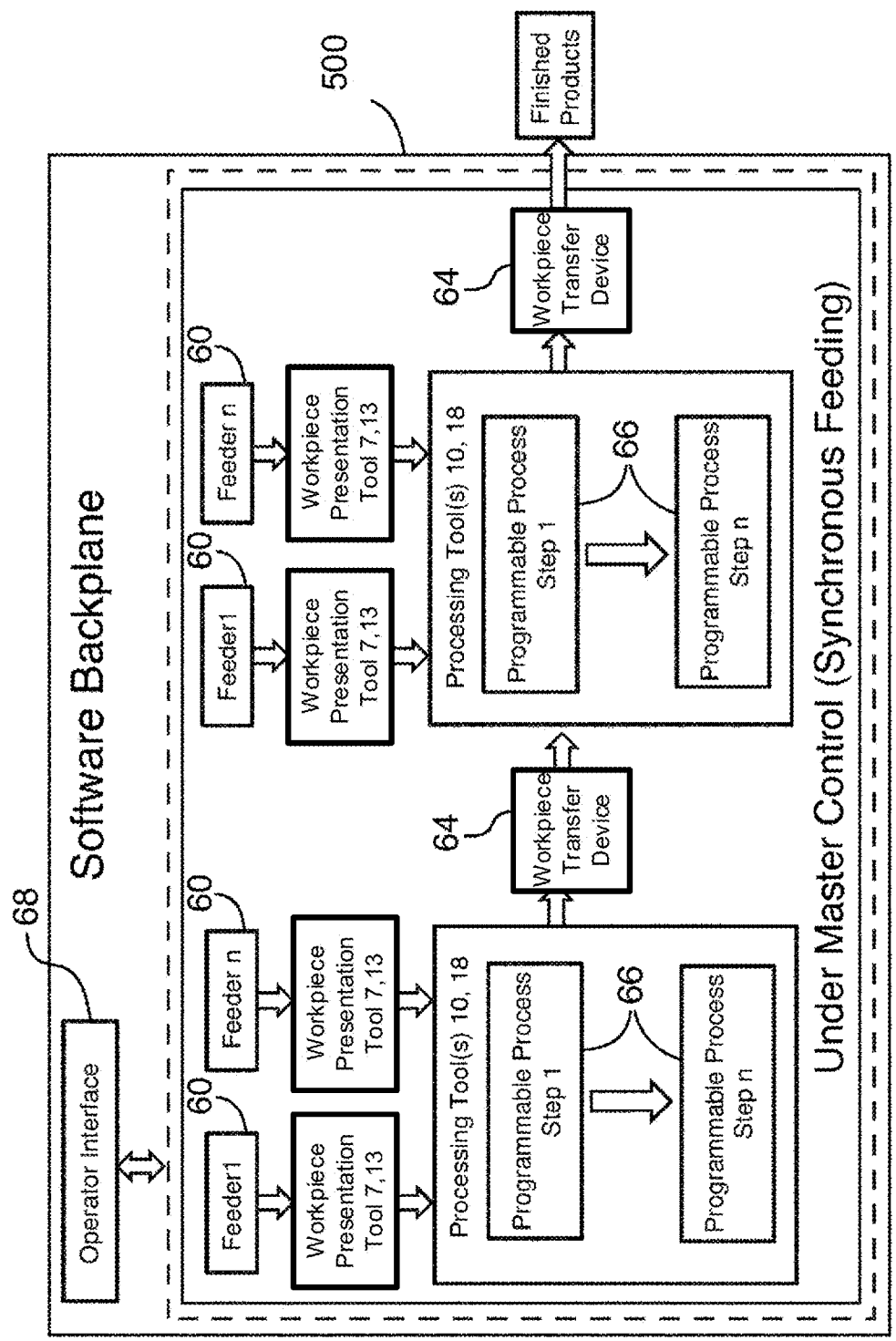
FIG. 6 is a schematic diagram of an example system for processing workpieces using synchronous feeding of workpieces.

Reference is now made to FIG. 5, which shows a schematic diagram of an example system 400 for processing workpieces using asynchronous feeding of workpieces and FIG. 6 is a schematic diagram of an example system 500 for processing workpieces using synchronous feeding of workpieces. Systems 400 and 500 can have similarities with part-processing device 110 explained above. In some embodiments, part-processing device 110 can be incorporated in whole or in part into one or both of systems 400 and 500. Systems 400 and 500 can be implemented in automated production station 100.

Systems 400 and 500 can be configured to carry out steps from or entire methods disclosed herein. Systems 400, 500 can receive workpieces 3 and/or other raw materials as inputs; progressively add value to them via one or more processing tools 10, 18; and finally discharges them either as discrete finished products, as unfinished products or as rejected scrap (i.e., defective products).

Accordingly, systems 400 and 500 can receive raw materials and/or workpieces 3 from one or more feeders 60. One or more feeders can be a track, or other devices configured to deliver its raw materials or workpieces 3 to one or more workpiece presentation tools 7, 13. The delivery from the feeders 60 can be done directly or via a respective buffer 62. Each workpiece presentation tools 7, 13 or a workpiece transfer device 64 can be numerically controlled and configured to deliver raw materials or workpieces to one or more processing tools 10, 18. Each processing tool 10, 18 can add value to a workpiece 3 (i.e., part, component or work-in-progress) via one or more programmable process steps 66. A given processing tool 10, 18 can operate in parallel to and/or in series with one or more other processing tools 10, 18. Once the workpiece 3 passes through a final processing tool 10, 18, it can be discharged either as a successfully completed and validated finished product, as an unfinished product or as rejected scrap. Human interaction with systems 400 and 500 can be done via operator interface 68.

The various elements described above can be controlled at least in part by software resources known as base software backplane. The backplane can be configured to permit various elements of system to carry out various control functions including: management of inputs and outputs; management of local control tasks, including programmable process steps 66 within processing tools 10, 18 and local inspection tasks within validation stations 70; communications between different elements in system 400, 500 and communication with a human user via operator interface 68.

In system 400 of FIG. 5, feeders 60 may not be electronically synchronized with any other element or operation of system 400 and can be controlled by software backplane and the operation of feeders 60 can still be in harmony with other elements of system 400. Accordingly, feeders 60 can supply workpieces 3 to workpiece presentation tools 7, 13 via buffers 62 (e.g., asynchronous feeding) and feeders 60 can be operated to keep a sufficient supply of workpieces 3 in respective buffers 62. Alternatively, in system 500 of FIG. 6, feeders 60 can be electronically synchronized with one or more element or operation of system 500 and can under the control of a master device for example in order to provide synchronous feeding of workpieces 3 directly (i.e., without buffers) to workpiece presentation tools 7, 13.

At least part of part-processing device 110 and systems 400, 500 can include a numerically synchronized control architecture. In various embodiments, workpiece transfer devices 64, workpiece presentation tools 7, 13 and processing tools 10, 18 can be numerically controlled. Accordingly, movements of workpieces 3 such as raw materials and work-in-process through systems 400 and 500 can occur along programmable axes of motion, which can be either rotary or linear. Movement of tooling associated with programmable process steps 66 of processing tools 10, 18 can also take place along programmable linear and/or rotary axes of motion.

Figure 7:
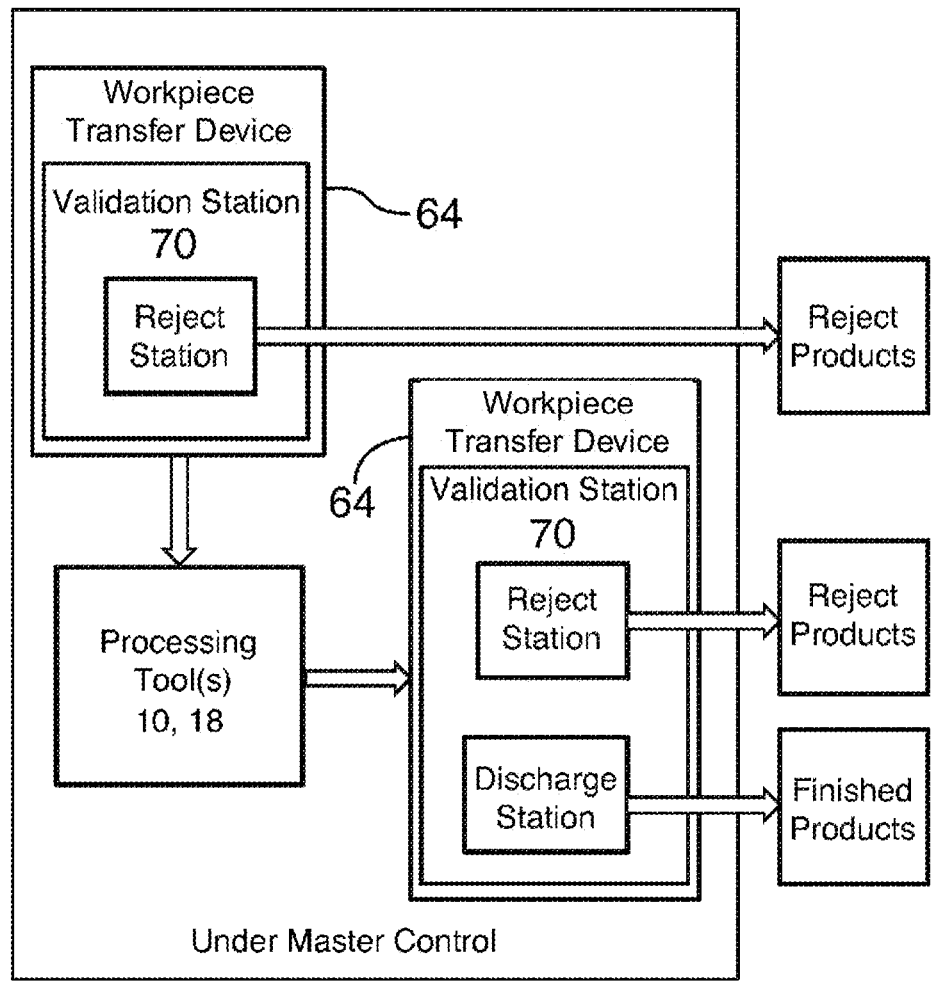
FIG. 7 is a schematic diagram of example workpiece transfer devices including validation stations.

Reference is now made to FIG. 7, which shows a schematic diagram of example workpiece transfer devices 64 including validation stations 70. Validation stations 70 can located at one or more feeders 60, workpiece presentation tools 7, 13, workpiece transfer devices 64 and/or processing tools 10, 18. Validation stations 70 can include devices configured to conduct inspections, checks, or tests on one or more of workpieces 3 such as raw materials or work-in-process. At these points, such workpieces 3 can be eliminated from system 400, 500 as scrap if they do not meet one or more predetermined inspection criteria. Validation station 70 can be configured to conduct an inspection operation on one or more of workpieces 3. The inspection operation can be electronically synchronized with a master device of part-processing device 110, and/or systems 400, 500.

Figure 8:
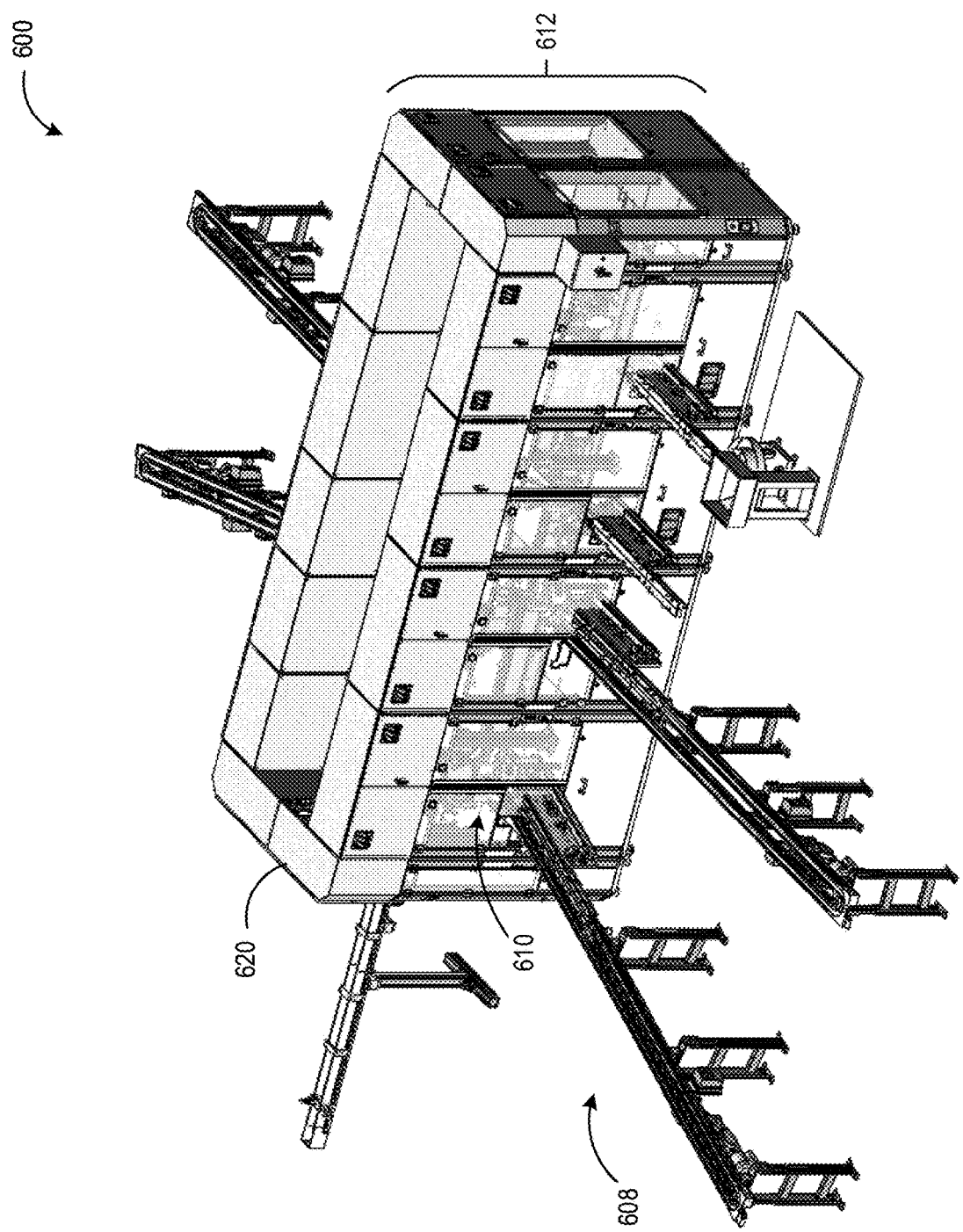
FIG. 8 is a perspective view of an example automated production station like that of FIG. 1.

Reference is now made to FIG. 8, which shows an example automated production station for mass producing a plurality of different products. The automated production station 600 includes one or more part-processing devices 610, a station control system 620, and a station power system 612, and one or more tracks 608.

The production station 600 can be any type of production station for manufacturing any type of product. For example, the production station 600 can be configured to manufacture food or beverage, textile, computer or electronic, vehicle, chemical, pharmaceutical, medical, cosmetic, or other products. The production station 600 can perform discrete manufacturing processes to produce discrete products or perform process manufacturing processes to produce bulk or undifferentiated products. The particular arrangement and configuration of the production station 600 can depend on the type of the product being manufactured.

Station control system 620 is an example of station control system 120. Station power system 612 can provide a common electrical power supply for the part-processing devices 610, the one or more tracks 608, and the station control system 120. Station power system 612 can include but is not limited to power supplies, converters, inverters, and energy storage components.

Each of the one or more part-processing devices 610 is an example of a part-processing device 110. The part-processing devices 610 can be configured to perform a specific processing task on a workpiece. For example, the one or more part-processing devices 610 can include one or more indexing devices that receive and index workpieces and one or more workpiece transfer devices that transfers the workpieces from the indexing devices to another part-processing device 610 for further processing.

The one or more part-processing devices 610 can include one or more transport tracks that move one or more workpieces among the part-processing devices 610. The transport tracks can move the workpieces along the production station 600 for the part-processing devices 610 to successively process the workpieces. The transport tracks can include a plurality of carriages mounted to the track. Each carriage can receive and transport a plurality of the workpieces.

In some embodiments, the carriages are shaped to receive the workpieces. If the workpieces have different shapes, part-processing devices 610 may selectively transfer workpieces to carriages shaped to receive the workpieces. If the workpieces have a similar shape, the carriage can be common for different workpieces and part-processing devices 610 can transfer workpieces to the carriages indiscriminately.

In some embodiments, the workpieces can be transferred among the part-processing devices 610 without a transport track. That is, the part-processing devices 610 can transfer one or more workpieces to other part-processing devices 610 directly, without the transport track. Similarly, the part-processing devices 610 can receive one or more workpieces from other part-processing devices 610 directly.

During operation of the production station 600, a workpiece can travel among the part-processing devices 610. For example, a workpiece can travel from a part-processing device, such as part-processing device 110a, to a downstream part-processing device, such as part-processing device 110b. Each part-processing device 610 can progressively process the workpiece until a product is complete.

In some embodiments, the part-processing devices 610 can be configured to process a plurality of workpieces in parallel. That is, a part-processing device 610 can receive a plurality of workpieces, process the plurality of workpieces in parallel, and transfer the plurality of workpieces to another part-processing device 610 for further processing.

Each part-processing device 610 can include one or more tooling components 230 for processing a workpiece. The processing tasks performed by the tooling components 230 of a particular part-processing device 610 can be related to each other. For example, the tooling components 230 of a particular part-processing device 610 can perform sub-steps or sub-processes in the overall processing task accomplished by the part-processing device 610. The tooling components 230 for a particular part-processing device 610 can, in some embodiments, be physically located proximate to each other. For example, the tooling components 230 for a particular part-processing device 610 may be housed within a common chassis or share a common power supply.

In some embodiments, the production station 600 can include one or more tracks 608. As shown in FIG. 8, one or more tracks 608 extend from the production station 600. Each of the one or more tracks 608 can include a conveyor. In some embodiments, a track 608 can transport a plurality of different workpieces. The plurality of different workpieces on a track 608 can have any arrangement and orientation. For example, a track 608 can receive different workpieces in series or in parallel.

In some embodiments, a track 608 can be configured as an in-feed track to transport workpieces into the production station 600 for processing. In some embodiments, a track 608 can be configured as an out-feed track to transport workpieces or products from the production station 600. Products may be transported out of the production station 600 after completion. Workpieces may be transported out of the production station 600 if they are surplus, not a component used in the products being produced, or have been identified as being defective. A workpiece may be identified as being defective if detected properties of the workpiece do not correspond to expected properties, as defined by part data for that type of part. In some embodiments, at least one of the one or more tracks 608 can be operable as both an in-feed track and an out-feed track.

Different configurations for the in-feed tracks and out-feed tracks are possible. For example, automated production station 600 can be configured to produce four different products, each product being output on one of four out-feed tracks. In another example, different products can be output on the same out-feed track.

Continuing with the example of four different products, each product can be assembled with two parts (e.g., a lid and a container body) and there can be different types of each part. For example, the lid can be round or square and the container body can be straight or curved. In some embodiments, both types of container bodies can be received at a first in-feed track and both types of lids can be received a second in-feed track. In other embodiments, a first type of lid and a first type of container body can be received at a first in-feed track and a second type of lid and a second type of container body can be received at a second in-feed track.

Figure 9:
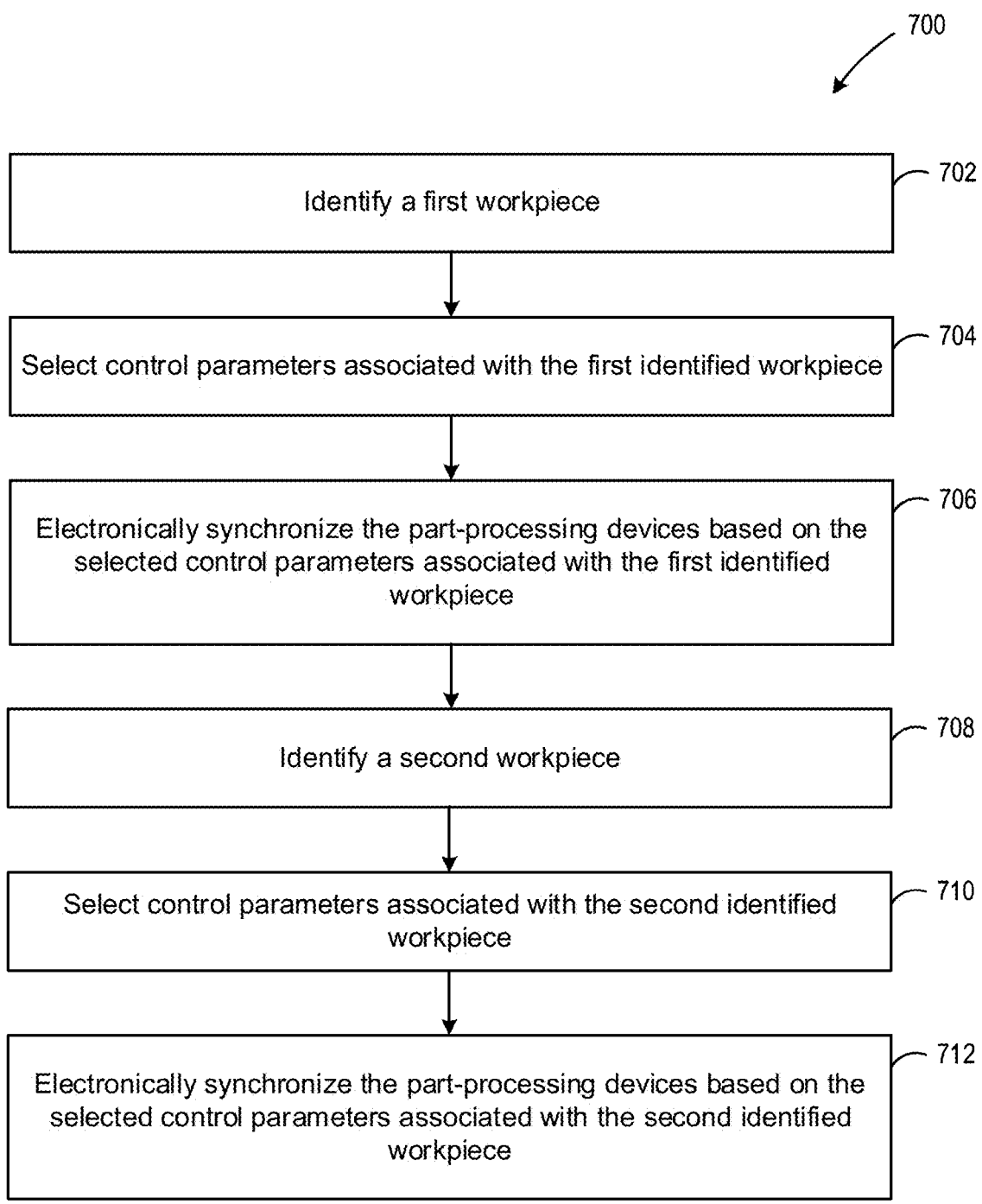
FIG. 9 is a flowchart diagram of a method for mass producing a plurality of different products using an automated production station like that of FIG. 8.

Reference is now made to FIG. 9, which is a flowchart of an example method 700 of mass producing a plurality of different products using an automated production station like that of FIG. 8. The method 700 can be implemented by an automated production station, such as automated production station 100, having a plurality of part-processing devices, such as part-processing devices 110.

Method 700 can begin at 702, when a first workpiece is received in the production station 100 and identified. The first workpiece can be received at a part-processing device 110. The identification of the first workpiece can involve determining the geometry of the first workpiece. The geometry of the first workpiece can be used to determine what the first workpiece is—whether the first workpiece is a part or a partially-assembled workpiece. Furthermore, parts can have different geometric properties, such as but not limited to, different types, shapes, and sizes.

In some embodiments, the sensor system 210 of the part-processing device 110 can include a scanner that can be used to scan the workpiece and generate identification data. For example, a part-processing device 110 can have an optical scanner that generates image data as identification data.

The processor 224 can receive the identification data and determine whether to further process the first workpiece. For example, the part-processing device 110 can determine that a part does not correspond to profile data for that part. For example, a cap may have a deformation, possibly due to a defect or damage. The part-processing device 110 can determine that the part should not be processed and divert the part out of the production station 100.

In another example, the part-processing device 110 can be configured to produce a bottle with a square cap/closure. However, the part-processing device 110 can identify a round cap and determine that the round cap is not a component of the current product being produced. As such, the part-processing device 110 can determine that the round cap should not be processed. In some embodiments, a downstream part-processing device 110 in the production station 100 can process the round cap. In other embodiments, the part-processing device 110 can divert the round cap out of the production station 100.

In another example, the part-processing device 110 can identify the part as being a component of a product currently being produced. However, the part may not be processed because the capacity of the production station 100 is at a pre-determined capacity. The capacity of the production station 100 can be based on a capacity of one or more part-processing devices 110 in the production station 100, a productivity rate of the one or more part-processing devices 110, or the supply of other components used for the product currently being produced. If it is determined that the part cannot be processed, the part-processing device 110 can divert the part out of the production station 100. In other embodiments, the part-processing device 110 can hold the part and process the part when capacity becomes available.

At 704, the method can involve selecting control parameters associated with the first workpiece identified in 702. Processor 224 can be configured to receive the identification data from the scanner and analyze the identification data. For example, a processor can receive the image data from the optical scanner and select the control parameters based on the image data received.

At 706, the part-processing devices 110 can be electronically synchronized based on the control parameters selected in 704 to perform coordinated operations on the first workpiece for producing a first product. For example, a part-processing device 110 can use one or more tooling components 230 to engage the first workpiece to adjust its orientation, transfer the first workpiece, or mate a part to the first workpiece, etc.

At 708, a second workpiece is received in the production station 100 and identified. The second workpiece is a different type from the first workpiece. Similar to 702, the identification of the second workpiece can involve determining what the second workpiece is.

In some embodiments, the second workpiece can be received at a different part-processing device 110 from the first workpiece. For example, the first workpiece can be received and identified at part-processing device 110a and the second workpiece can be received and identified at part-processing device 110b.

In some embodiments, the second workpiece can be received at a common part-processing device 110 as the first workpiece. For example, both the first workpiece and the second workpiece can be received and identified at part-processing device 110a.

In some embodiments, the first workpiece and the second workpiece are fed into the production station 100 on a common in-feed track. The common part-processing device 110 can receive both the first workpiece and the second workpiece from the common in-feed track. In other embodiments, a first part-processing device 110a can identify and retrieve the first workpiece from the common in-feed track and a second part-processing device 110b can identify and retrieve the second workpiece from the common in-feed track. The first part-processing device 110a can identify the second workpiece on the common in-feed track and leave (i.e., not retrieve) the second workpiece on the common in-feed track. Similarly, the second part-processing device 110b can identify the first workpiece on the common in-feed track and leave (i.e., not retrieve) the first workpiece on the common in-feed track.

The processor 224 can receive the identification data and determine whether to further process the second workpiece. Determining whether to further process the second workpiece can be similar to determining whether to further process the first workpiece at 702. For example, the part-processing device 110 can determine that a part does not correspond to profile data for that part, a part is not a component of the product currently produced, or that a part cannot be processed.

At 710, the method can involve selecting control parameters associated with the second workpiece identified in 708. Similar to selecting control parameters associated with the first workpiece at 704, processor 224 can be configured to receive the identification data for the second workpiece from the scanner and analyze the identification data.

At 712, the part-processing devices 110 can be electronically synchronized based on the control parameters selected in 710 to perform coordinated operations on the second workpiece for producing a second product. Electronically synchronizing the part-processing devices 110 based on the control parameters selected in 710 can be similar to synchronizing the part-processing devices 110 based on the control parameters selected in 704.

The method can continue repeating 702 to 706 a plurality of times for producing a plurality of the first products and repeating 708 to 712 a plurality of times for producing a plurality of the second products interchangeably with the first products.

Figure 10:
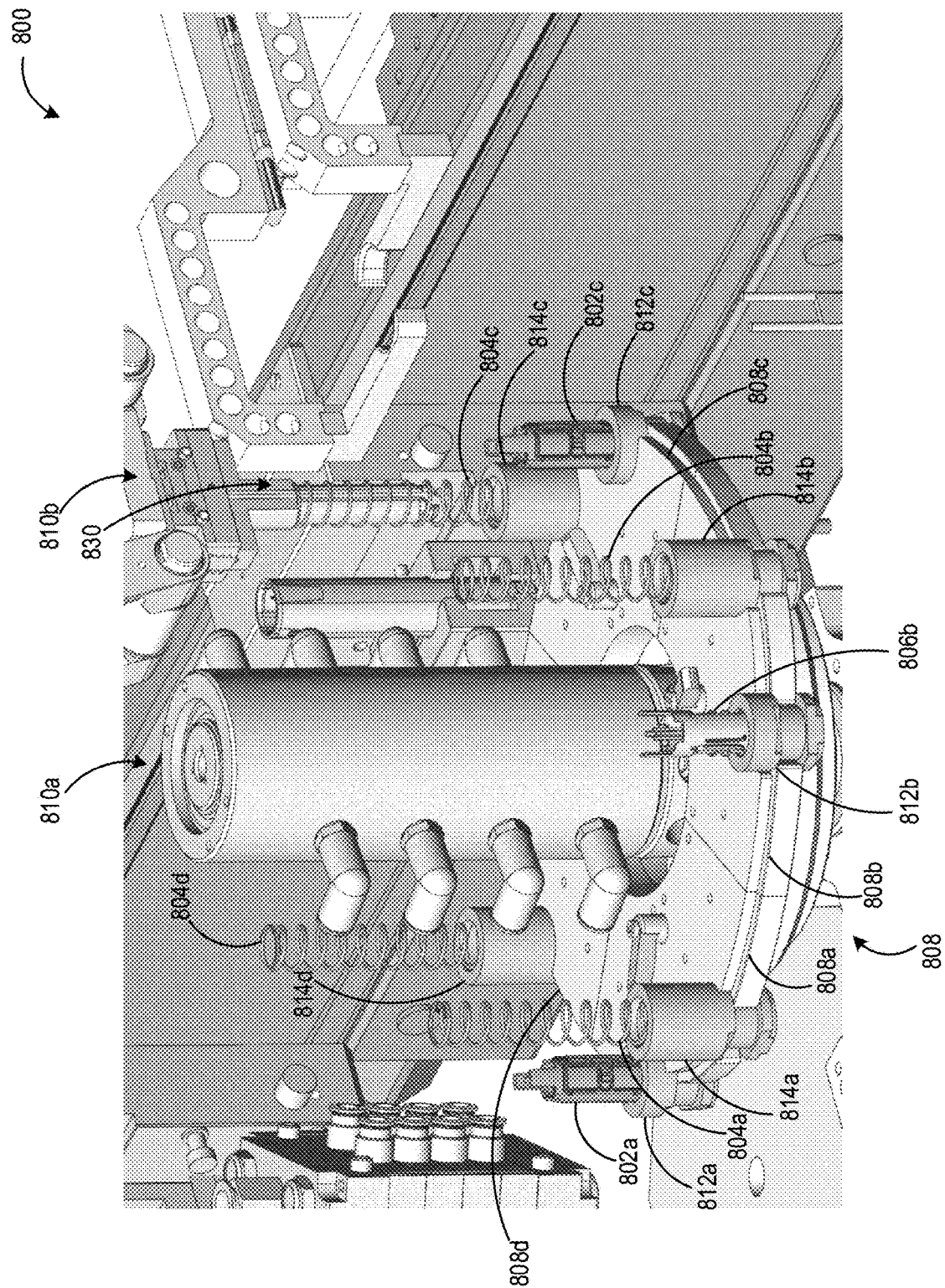
FIG. 10 is a perspective view of example part-processing devices for the automated production station of FIG. 8, including an example indexing device and an example workpiece transfer device.

Reference is now made to FIG. 10, which shows a perspective view of an example part-processing devices for an automated production station 800, including example indexing device 810a and an example workpiece transfer device 810b. Automated production station 800 is an example of an automated production station 100. Furthermore, indexing device 810a and workpiece transfer device 810b are examples of part-processing devices 110. Although only two part-processing devices 810a, 810b are shown in FIG. 10, production station 800 can include fewer or more part-processing devices 810.

The indexing device 810a can include a rotary indexing table 808 rotatable about a table axis. As can be seen in FIG. 10, the rotary indexing table 808 can have a plurality of interchangeable sector plates 808a, 808b, 808c, and 808d.

The indexing device 810a also includes a plurality of first platforms 812a, 812b, 812c (and a fourth one not shown in FIGS. 10) spaced apart from each other about the axis, and a plurality of second platforms 814a, 814b, 814c, and 814d spaced apart from each other and the first platforms 812 about the axis. Although indexing device 810a has four first platforms 812 and four second platforms 814 in FIG. 10, it will be understood that fewer or more platforms is possible.

The rotary indexing table 808 has a plurality of retaining features for removably mounting the first and second platforms 812, 814. For example, the retaining feature can be an opening in a periphery of the table. Each sector plate can include at least one of retaining features. Each first and second platform 812, 814 is removably mountable in any one of the retaining features. In some embodiments, the openings are specific to the first and second platforms—that is, the first platforms are only mountable to a first set of openings and the second platforms are only mountable to a second set of openings. In some embodiments, the first and second platforms can be affixed to the rotary indexing table 808.

As shown in FIG. 10, the workpieces 802, 804, and 806 can be shaped differently from each other. Each first platform 812 can have a first mount shaped for holding a first workpiece 802 in a selected orientation. First workpieces 802a, 802c can be received on corresponding first platforms 812a, 812c for indexing. Each second platform 814 can have a second mount shaped for holding a second workpiece 804 in a selected orientation, the second mount shaped differently from the first mount. Second workpieces 804a, 804b, 804c, and 804d can be received on corresponding second platforms 814a, 814b, 814c, and 814d for indexing.

In other embodiments, the platforms are not shaped for holding specific workpieces. Instead, each platform can have a mount shaped for holding any one of a plurality of the workpieces. That is, the shape of the workpieces may be sufficiently similar so that the workpieces can be held by the same mount. For example, the first mount can also be shaped for holding the third workpiece 806 in a selected orientation. Third workpieces 806b, 806d (not shown in FIG. 10) can be received on first platforms 812b, 812d (not shown in FIG. 10) for indexing. That is, the first platform 812 can be common to the first workpieces 802 and the third workpieces 806.

Figure 12C:
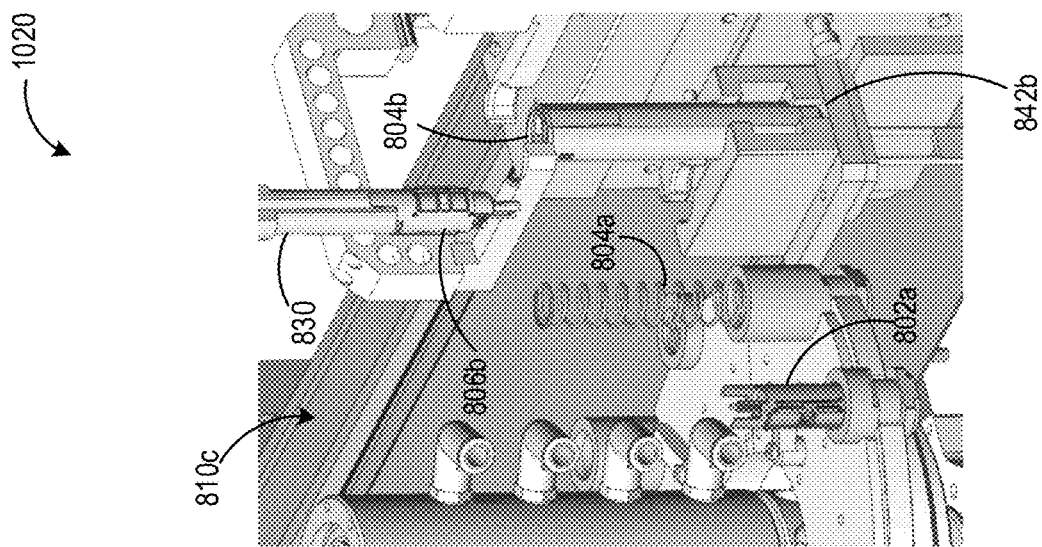
FIG. 12A-12C show the workpiece transfer device of FIG. 10 transferring a second workpiece from the indexing device of FIG. 10 for further processing.
Figure 12B:
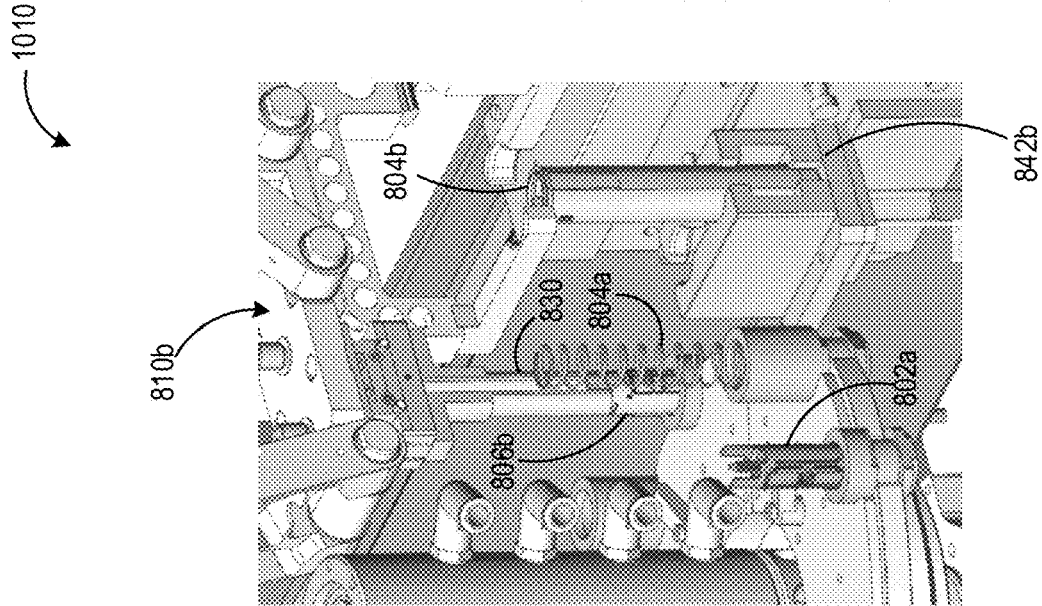
Figure 12A:
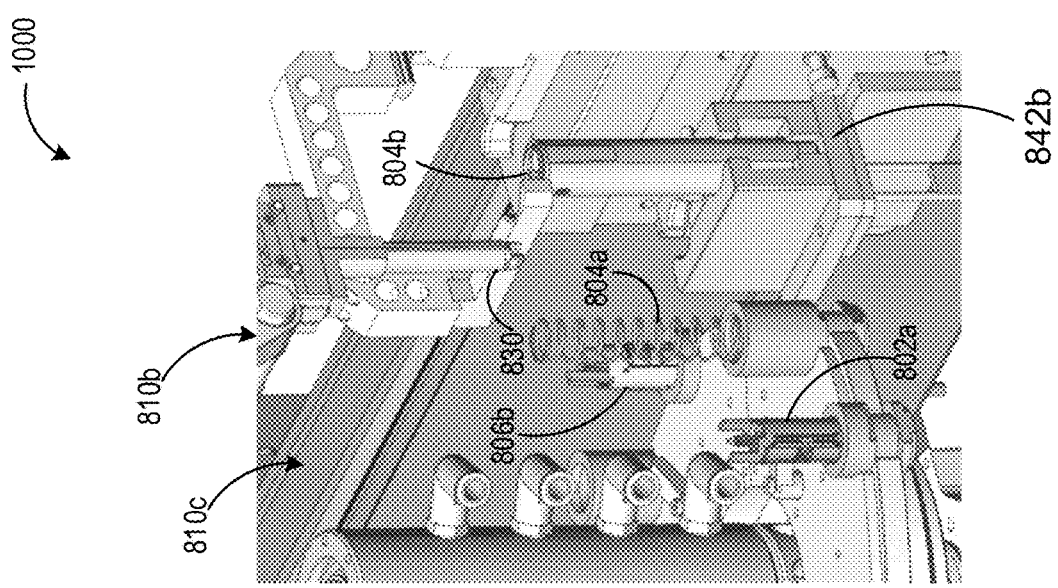

Reference is now made to FIG. 11A to 11C, which show the example workpiece transfer device 810b transferring a first workpiece 802c from the indexing device 810a for further processing, and FIG. 12A to 12C, which illustrate the example workpiece transfer device 810b transferring a third workpiece 806b from the indexing device 810a for further processing. The workpiece transfer device 810b can include one or more tooling components 230, such as example tooling component 830, for processing different workpieces 802, 804, 806 at 706 and 712.

Workpieces 802, 804, 806 have different shapes that can require different tooling components 230. In some embodiments, the workpiece transfer device 810b can have a first tooling for transferring the first workpieces 802 and a second tooling for transferring the second workpieces 804. The workpiece transfer device 810b can automatically switch between the first tooling and the second tooling for performing operations on the first workpieces 802 and the second workpieces 804, respectively.

In some embodiments, the workpiece transfer device 810b can use a common tooling component 830 for processing the different workpieces 802, 804, 806 at 706 and 712. As shown in FIG. 10 to FIG. 12C, although workpieces 802, 804, 806 have different shapes, tooling component 830 can transfer each of the first workpieces 802, the second workpieces 804, and third workpieces 806.

As shown in FIG. 10 to FIG. 12C, tooling 830 directly engages with the workpieces 802, 804, 806. In some embodiments, the workpiece transfer device 810b can transfer workpieces 802, 804, 806 mounted in the first and second platforms 812, 814. That is, the workpiece transfer device 810b can use tooling to engage with the first and second platforms 812, 814. Furthermore, the workpiece transfer device 810b can use common tooling to engage either of the first and second platforms 812, 814. In other embodiments, a first tooling can directly engage the first platform 812 and a second tooling can directly engage the second platform 814. The workpiece transfer device 810b can automatically switch between the first tooling and the second tooling, and vice versa.

In some embodiments, a workpiece transfer device 810b can mate a first workpiece 802 with a second workpiece 804 to assemble the first product and a third workpiece 806 with a second workpiece 804 to assemble the second product. In other embodiments, a first workpiece transfer device 810b can mate a first workpiece 802 with a second workpiece 804 to assemble the first product and a second workpiece transfer device 810b can mate a third workpiece 806 with a second workpiece 804 to assemble a second product.

In some embodiments, the common workpiece transfer device 810b that mates each of a first workpiece 802 and a third workpiece 806 with a respective second workpiece 804 can also divert the first product to an out-feed track that is different from the second product. That is, the common part-processing device 810b can divert the first product to a first out-feed track and the second product to a second out-feed track. In some embodiments, both the first product and the second product are transferred to a common out-feed track.

In some embodiments, the workpiece transfer device 810b can also mate a first workpiece 802 with a fourth workpiece received in the production station 100 instead of a second workpiece 804 to assemble a third product and a third workpiece 806 with a respective fourth workpiece to assemble a fourth product. A first workpiece transfer device 810b can mate a first workpiece 802 with a fourth workpiece and a second workpiece transfer device 810b can mate a third workpiece 806 with a fourth workpiece. Alternatively, a common workpiece transfer device 810b can mate each of a first workpiece 802 and a third workpiece 806 with a respective fourth workpiece.

In some embodiments, the common workpiece transfer device 810b that mates each of a first workpiece 802 and a third workpiece 806 with a fourth workpiece can also divert the third product to an out-feed track that is different from the fourth product. That is, the common part-processing device can divert the third product to a third out-feed track and the fourth product to a fourth out-feed track. In some embodiments, both the third product and the fourth product are transferred to a common out-feed track. Alternatives are possible. For example, each of the third product or the fourth product can be transferred to the first out-feed track for the first product, the second out-feed track for the second product, or the common out-feed track for the first and second products.

In illustration 900 of FIG. 11A, the workpiece transfer device 810b can move towards first workpiece 802c on the indexing device 810a. The indexing device 810a can rotate about its table axis so that the first workpiece 802c is proximate to the transport track 810c having carriage 842a. Second workpiece 804c is held in carriage 842a.

In illustration 910 of FIG. 11B, the workpiece transfer device 810b uses tooling 830 to engage the first workpiece 802c. In illustration 920 of FIG. 11C, the workpiece transfer device 810b moves the first workpiece 802c to carriage 842a. Although not shown, the workpiece transfer device 810b can release the first workpiece 802c to be mated with the second workpiece 804c in the carriage 842a. The transport track 810c can move carriage 842a to another part-processing device for further processing. The transport track 810c can move another carriage 842b to be positioned proximate to the indexing device 810a.

The indexing device 810a can rotate about its table axis so that the third workpiece 806b is positioned proximate to the transport track 810c, as shown in illustration 1010 of FIG. 12A. Similar to illustrations 900, 910, and 920, in illustrations 1000, 1010, and 1020, the workpiece transfer device 810b can move toward the third workpiece 806b on the indexing device 810a, engage the third workpiece 806b, and move the third workpiece 806b to carriage 842b.

Although only one workpiece is shown in carriage 842, carriage 842 can receive and transport a plurality of workpieces. For example, carriage 842 can receive and transport a plurality of a first product, a plurality of a second product, or one of each of the first product and the second product.

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein.

It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should be noted that the term "coupled" used herein indicates that two elements can be directly coupled to one another or coupled to one another through one or more intermediate elements.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example and without limitation, the programmable computers (referred to below as computing devices) may be a server, network appliance, embedded device, computer expansion module, a personal computer, laptop, personal data assistant, cellular telephone, smart-phone device, tablet computer, a wireless device or any other computing device capable of being configured to carry out the methods described herein.

In some embodiments, the communication interface may be a network communication interface. In embodiments in which elements are combined, the communication interface may be a software communication interface, such as those for inter-process communication (IPC). In still other embodiments, there may be a combination of communication interfaces implemented as hardware, software, and combination thereof.

Program code may be applied to input data to perform the functions described herein and to generate output information. The output information is applied to one or more output devices, in known fashion.

Each program may be implemented in a high level procedural or object oriented programming and/or scripting language, or both, to communicate with a computer system. However, the programs may be implemented in assembly or machine language, if desired. In any case, the language may be a compiled or interpreted language. Each such computer program may be stored on a storage media or a device (e.g. ROM, magnetic disk, optical disc) readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled and non-compiled code.

Various embodiments have been described herein by way of example only. Various modification and variations may be made to these example embodiments without departing from the spirit and scope of the invention, which is limited only by the appended claims. Also, in the various user interfaces illustrated in the drawings, it will be understood that the illustrated user interface text and controls are provided as examples only and are not meant to be limiting. Other suitable user interface elements may be possible.

The invention claimed is:

1. A method of mass producing different products in an automated production station having a plurality of part-processing devices, comprising:
   a) identifying a first workpiece received in the production station;
   b) selecting control parameters associated with the first workpiece identified in (a);
   c) electronically synchronizing the part-processing devices based on the control parameters selected in (b) to perform coordinated operations on the first workpiece for producing a first product, the operations including mating the first workpiece with a respective second workpiece received in the production station for assembly of the first product;
   d) identifying a third workpiece received in the production station, the third workpiece shaped differently from the first workpiece;
   e) selecting control parameters associated with the third workpiece identified in (d);
   f) electronically synchronizing the part-processing devices based on the control parameters selected in (e) to perform coordinated operations on the third workpiece for producing a second product, the operations including mating the third workpiece with another respective second workpiece received in the production station for assembly of the second product, each second workpiece having a common shape different from that of the first and third workpieces; and
   g) repeating (a) to (c) to produce a plurality of the first products and repeating (d) to (f) to produce a plurality of the second products interchangeably with the first products in a continuous mass production process.

2. The method of claim 1, wherein the first workpiece and the third workpiece are fed into the production station on a common input track, and received in the production station by a common part-processing device of the plurality of part-processing devices.

3. The method of claim 1, wherein at least one of the part-processing devices performs operations on the first workpiece and on the third workpiece using common tooling.

4. The method of claim 1, wherein at least one of the part-processing devices automatically switches between first tooling and second tooling for performing operations on the first workpiece and the third workpiece, respectively.

5. The method of claim 1, wherein a first part-processing device of the plurality of part-processing devices comprises an indexing device and a second part-processing device of the plurality of part-processing devices comprises a workpiece transfer device, and the operations in (c) and (f) include receiving and indexing the first and third workpieces, respectively, using the indexing device, and transferring the first and third workpieces, respectively, from the indexing device to a third part-processing device of the plurality of part-processing devices for further processing using the workpiece transfer device.

6. The method of claim 5, wherein the indexing device comprises an indexing table rotatable about a table axis, a plurality of first platforms mounted to the table and spaced apart from each other about the axis, and a plurality of second platforms mounted to the table and spaced apart from each other and the first platforms about the axis, and wherein the first and second workpieces are received on corresponding first and second platforms, respectively, for indexing.

7. The method of claim 6, wherein each first platform has a first mount portion holding the first workpiece in a selected orientation and each second platform has a second mount portion holding the second workpiece in a selected orientation.

8. The method of claim 6, wherein the indexing table has a plurality of retaining features to which the first and second platforms are mounted, each first platform and second platform removably mountable in any one of the retaining features.

9. The method of claim 8, wherein the retaining features comprise a plurality of openings in a periphery of the table, and each platform has a locating portion spaced apart from the mount portion for sliding radially into and out from any one of the openings.

10. The method of claim 1, wherein the identifying in (a) and (d) is based on identification data generated by a scanner of the production station.

11. The method of claim 10, wherein the identification data comprises image data generated by an optical scanner of the production station.

12. The method of claim 10, wherein the control parameters are selected in (b) and (e) based on the identification data.

13. The method of claim 1, wherein the identifying in (a) and (d) comprises determining whether to process the first workpiece for producing the first product in the production station and determining whether to process the third workpiece for producing the second product in the production station, respectively.

14. The method of claim 13, wherein determining whether to process the first workpiece and the third workpiece comprises determining whether the first and third workpieces correspond to components for producing the first and second products, respectively.

15. The method of claim 13, wherein determining whether to process the first and third workpieces comprises determining whether the production station has capacity for producing the first and second products, respectively.

16. The method of claim 1, wherein the production station comprises a transport track and a plurality of carriages mounted to the track, and wherein the first and third workpieces are transferred to one or more carriages for transport along the track to one or more downstream part-processing devices.

17. The method of claim 16, wherein each carriage carries one or more first workpieces and one or more third workpieces.

18. The method of claim 17, further comprising moving the carriage along the track to a downstream part-processing device while carrying the one or more first workpieces and the one or more third workpieces, and selecting either the one or more first workpieces or the one or more third workpieces for processing by the downstream part-processing device.

19. An automated production station for mass producing different products, comprising:
a plurality of part-processing devices; and
a processor configured to:
  a) identify a first workpiece received in the production station;
  b) select control parameters associated with the first workpiece identified in (a);
  c) electronically synchronize the part-processing devices based on the control parameters selected in (b) to perform coordinated operations on the first workpiece for producing a first product, the operations including mating the first workpiece with a respective second workpiece received in the production station for assembly of the first product;
  d) identify a third workpiece received in the production station, the third workpiece shaped differently from the first workpiece;
  e) select control parameters associated with the third workpiece identified in (d);
  f) electronically synchronize the part-processing devices based on the control parameters selected in (e) to perform coordinated operations on the third workpiece for producing a second product, the operations including mating the third workpiece with another respective second workpiece received in the production station for assembly of the second product, each second workpiece having a common shape different from that of the first and third workpieces; and
  g) repeat (a) to (c) to produce a plurality of the first products and repeat (d) to (f) to produce a plurality of the second products interchangeably with the first products in a continuous mass production process.

20. The automated production station of claim 19, wherein one of the plurality of part-processing devices comprises an indexing device including:
  a) an indexing table rotatable about an axis, the table including a plurality of retaining features spaced apart from each other about the axis;
  b) a plurality of first platforms removably mounted to corresponding retaining features, each first platform including a first mount portion shaped for holding a respective first workpiece in a selected orientation for indexing of the first workpiece through rotation of the table;
  c) a plurality of second platforms removably mounted to corresponding retaining features, each second platform including a second mount portion shaped for holding a respective second workpiece in a selected orientation for indexing of the second workpiece through rotation of the table; and
  d) a plurality of third platforms removably mounted to corresponding retaining features, each third platform including a third mount portion for holding a respective third workpiece in a selected orientation for indexing of the third workpiece through rotation of the indexing table, wherein each platform is removably mountable to any one of the retaining features.

* * * * *